(12) United States Patent
Buchheit (10) Patent No.: US 8,316,736 B2
(45) Date of Patent: Nov. 27, 2012

(54) STEERING COLUMN COVER

(75) Inventor: Nathaniel Buchheit, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1087 days.

(21) Appl. No.: 12/245,839

(22) Filed: Oct. 6, 2008

(65) Prior Publication Data

US 2010/0083787 A1   Apr. 8, 2010

(51) Int. Cl.
  *B62D 1/16*   (2006.01)
  *A47G 1/18*   (2006.01)
  *A47G 5/02*   (2006.01)
  *A47H 1/00*   (2006.01)
  *B60T 1/20*   (2006.01)

(52) U.S. Cl. ............ 74/492; 74/493; 296/214; 160/238; 160/370.22

(58) Field of Classification Search .............. 74/18, 493, 74/558, 492; 296/214; 160/238, 370.22
  See application file for complete search history.

(56) References Cited

U.S. PATENT DOCUMENTS

| 2,547,692 | A | * | 4/1951 | D Azzo .......................... 160/45 |
|---|---|---|---|---|
| 3,019,954 | A | | 2/1962 | Faltin |
| 4,899,612 | A | | 2/1990 | Bruhnke et al. |
| 5,067,546 | A | | 11/1991 | Jeuffray et al. |
| 5,280,956 | A | | 1/1994 | Tanaka et al. |
| 5,653,277 | A | | 8/1997 | Kerner et al. |
| 6,056,350 | A | | 5/2000 | Brutsaert |
| 6,183,011 | B1 | | 2/2001 | Andronis |
| 6,237,667 | B1 | * | 5/2001 | Fraczek et al. ............. 160/121.1 |
| 6,309,076 | B1 | * | 10/2001 | McVicker ..................... 359/601 |
| 6,402,217 | B1 | | 6/2002 | Ament et al. |
| 6,513,858 | B1 | | 2/2003 | Li et al. |
| 7,008,009 | B2 | | 3/2006 | Grimm et al. |
| 7,013,946 | B2 | | 3/2006 | Beck et al. |
| 7,077,431 | B2 | | 7/2006 | Gayer et al. |
| 7,185,694 | B2 | | 3/2007 | Dunn et al. |
| 7,240,944 | B2 | | 7/2007 | Plettrichs et al. |

(Continued)

FOREIGN PATENT DOCUMENTS

FR   2 738 308   *   3/1997

(Continued)

OTHER PUBLICATIONS

English Abstract of FR 2 738 308.*

(Continued)

*Primary Examiner* — Vinh Luong
(74) *Attorney, Agent, or Firm* — Mark E. Duell; Rankin, Hill & Clark LLP (57) ABSTRACT

A cover assembly for covering a steering column of a telescoping steering assembly is provided. The cover assembly includes a roller portion, a blind portion, and a clip portion. The roller portion is attached within a meter panel, and includes a rod mounted between a pair of tensioners. The blind portion includes a film that is attached at a proximal end to the rod, such that the film is wound and unwound around the rod. The rod is biased by the tensioners to pull the film in a wound direction. At a distal end, the film is attached to the clip portion. The clip portion engages a hook in the film and attaches the film to a steering base. As the steering column moves in a linear, telescoping manner, the film covers the steering column while remaining taut.

4 Claims, 8 Drawing Sheets

U.S. PATENT DOCUMENTS

| | | |
|---|---|---|
| 7,300,072 B2 | 11/2007 | Ercolano et al. |
| 2002/0059986 A1* | 5/2002 | Schlecht et al. .............. 160/120 |
| 2004/0113467 A1* | 6/2004 | Grimm et al. ................. 296/214 |
| 2004/0129098 A1* | 7/2004 | Gayer et al. ....................... 74/18 |
| 2005/0225123 A1* | 10/2005 | Grimm et al. ................. 296/214 |
| 2006/0037794 A1 | 2/2006 | Riha |
| 2006/0260770 A1 | 11/2006 | Gradl |
| 2007/0144689 A1 | 6/2007 | Walter et al. |
| 2007/0145731 A1 | 6/2007 | Ikeda et al. |
| 2007/0296194 A1 | 12/2007 | Ridgway et al. |

FOREIGN PATENT DOCUMENTS

| | | |
|---|---|---|
| FR | 2880858 | 7/2006 |

OTHER PUBLICATIONS

International Search Report dated Dec. 4, 2009.
Written Opinion of the International Searching Authority dated Dec. 4, 2009.
Supplementary European Search Report of EP09819682 dated Jan. 30, 2012.

* cited by examiner

STEERING COLUMN COVER

FIELD OF THE INVENTION

The present invention relates to a tensioned film for covering a telescoping steering column.

BACKGROUND OF THE INVENTION

In an effort to improve the driving experience, automotive designers attempt to design ergonomic, comfortable vehicle interiors. Along these lines, some automobiles come equipped with seats that are adjustable in several different directions, position adjustable pedals, and movable steering columns. These three features cooperate to allow a driver to sit in a comfortable position while having an optimal view of the road and control of the vehicle.

With specific reference to adjustable steering columns, drivers can adjust the position of the steering wheel based on the length of the driver's arms, the desired seating position of the driver, and other factors dealing with the comfort of the driver and the driver's control of the vehicle. Generally, the steering column can be adjusted through two different types of motion.

The first type of motion is known as tilt steering. Tilt steering allows the steering column to pivot about a horizontal axis so as to assume different angles and thereby set the steering wheel at different heights relative to the driver. The tilt action allows the driver to select an optimal steering wheel height and angle. The second type of motion is generally known as a telescoping steering assembly in which the steering wheel is movable in a linear direction toward and away from the driver. The tilt and telescoping assemblies may be used together.

In the highly competitive automotive field, designers must consider the stylistic characteristics as well as the functional benefits of new features. This is especially true for vehicle interiors. In this regard, movable steering wheels present unique aesthetic design issues. Particularly, the movable steering column should be covered by a decorative trim component that both compliments the interior style characteristics as well as allows the steering column the necessary range of motion.

Figure 1:
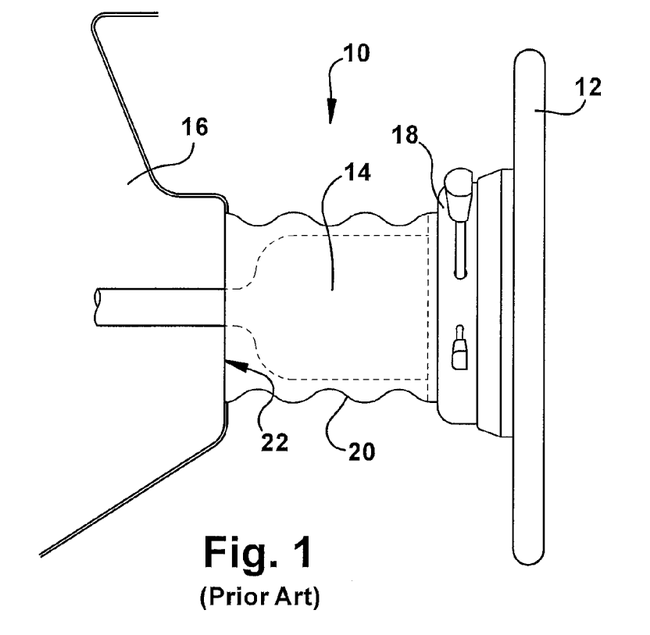
FIG. 1 is a steering column cover according to the prior art.
Figure 2:
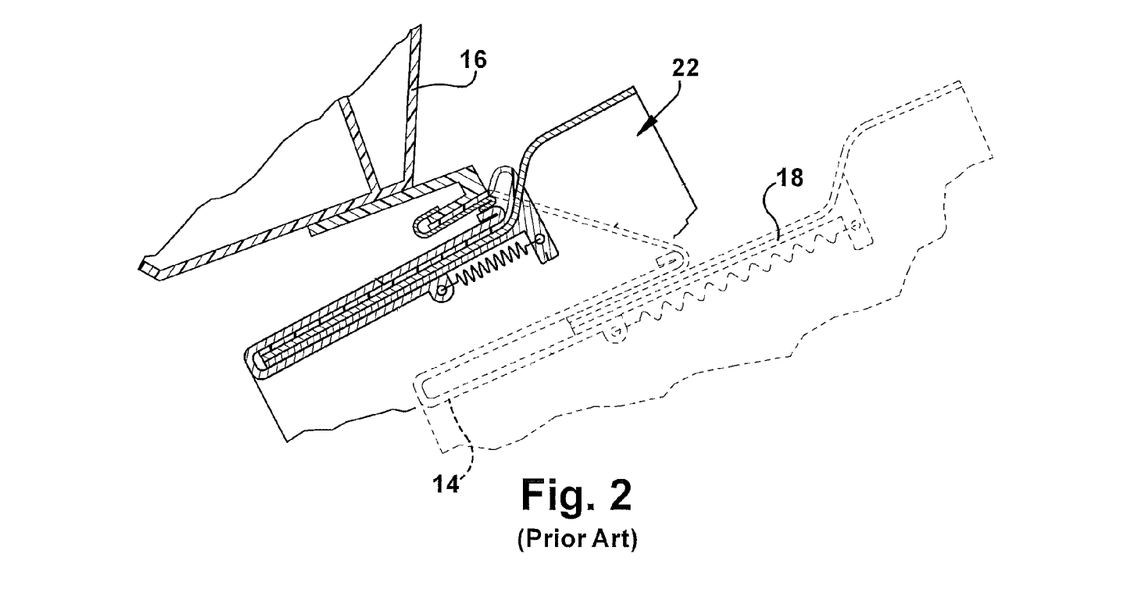
FIG. 2 is a schematic view of the steering column cover according to the prior art.

One steering column cover utilized in a telescoping steering assembly 10 is shown in FIG. 1. The steering assembly 10 has a steering wheel 12 attached to translational components (not shown) within a meter panel 16 through a telescoping steering column 14. The steering wheel 12 is formed as a large ring, and is attached to a base 18. The base 18 extends from the steering wheel 12 toward the meter panel 16, and is attached to the steering column 14. While the steering wheel 12 is rotatable by the driver, the base 18 is fixedly attached to the steering column 14 so as to not rotate integrally with the steering wheel 12. The steering column 14 extends from the steering base 18, through a meter panel opening 22, and into the meter panel 16.

The functional engagement of the steering components is made in a conventional manner. The meter panel 16 is a decorative interior trim panel, and can be formed of a polymer, stitched leather, or other decorative material, such as finished wood. The steering wheel 12 is also provided with a decorative finish that preferably compliments that of the meter panel 16. To complete the aesthetic design of the steering assembly 10, a steering column cover 20 is fitted over the steering column 14 so as to cover the steering column 14.

The cover 20 has a cross-sectional shape that roughly mirrors that of the steering column 14. At a distal end, the cover 18 is attached to the steering wheel base 18, and at a proximal end is attached to the meter panel 16, in a vicinity of the meter panel opening 22. The cover 20 has a length that is at least as long as the maximum length that can be obtained between the steering wheel base 18 and the meter panel 16. In this way, the steering column 14 is encircled and covered by the cover 18.

While covering the steering column 14, the cover 20 has aesthetic drawbacks. Particularly, when the steering column 14 is not fully extended from the meter panel 16, the cover 20 is necessarily slack, and therefore is either wrinkled or loose. The wrinkled or loose appearance is a drawback that detracts from the aesthetic appearance of the vehicle's interior.

Accordingly, there is a need in the art for a steering column cover for a telescoping steering column that covers the column while removing slack from the covering cloth.

SUMMARY OF THE INVENTION

The present invention provides a column cover that follows the contour of the steering column, reduces slack in the cover regardless of the amount the telescoping steering column is extended/retracted, and reduces the space required for the column cover within the meter panel. Particularly, the present invention is directed to a retractable film column cover blind for use with a telescoping steering assembly.

The column cover blind includes a roller portion, a blind portion, and a clip portion. The roller portion is held within a vehicle meter panel. The roller portion includes a rod rotatably connected to tensioners through a spring so as to bias the rod in a direction of rotation away from the steering wheel. The blind portion includes a film that is attached to and wound around the rod. A distal end of the film is attached to the clip portion, which is secured to a steering base adjacent the steering wheel. This assembly ensures that the film can be wound and unwound in response to the extension and retraction of the steering column. Further, the film remains taut as a result of the spring biasing the rod, and therefore will not have excess slack, nor will the film wrinkle.

Further, the film can be manipulated to take a shape of the steering column so as to cover an upper and side surfaces of the steering column. This is accomplished by having the film extend from an upside-down U-shaped opening in the meter panel, along the length of the steering column, and connect to the steering base at an upside-down U-shaped clip. The upside-down U-shaped opening in the meter panel cooperates with the steering column extending therethrough to define an upside-down U-shaped slit. This assembly forms the film into an upside-down U-shape by requiring the film to be in an upside-down U-shape when extending through the meter panel opening, and also holding the film in an upside-down U-shape at the upside-down U-shaped clip.

BRIEF DESCRIPTION OF THE DRAWINGS

These and further features of the invention will be apparent with reference to the following description and drawings.

DETAILED DESCRIPTION OF THE INVENTION

Figure 3:
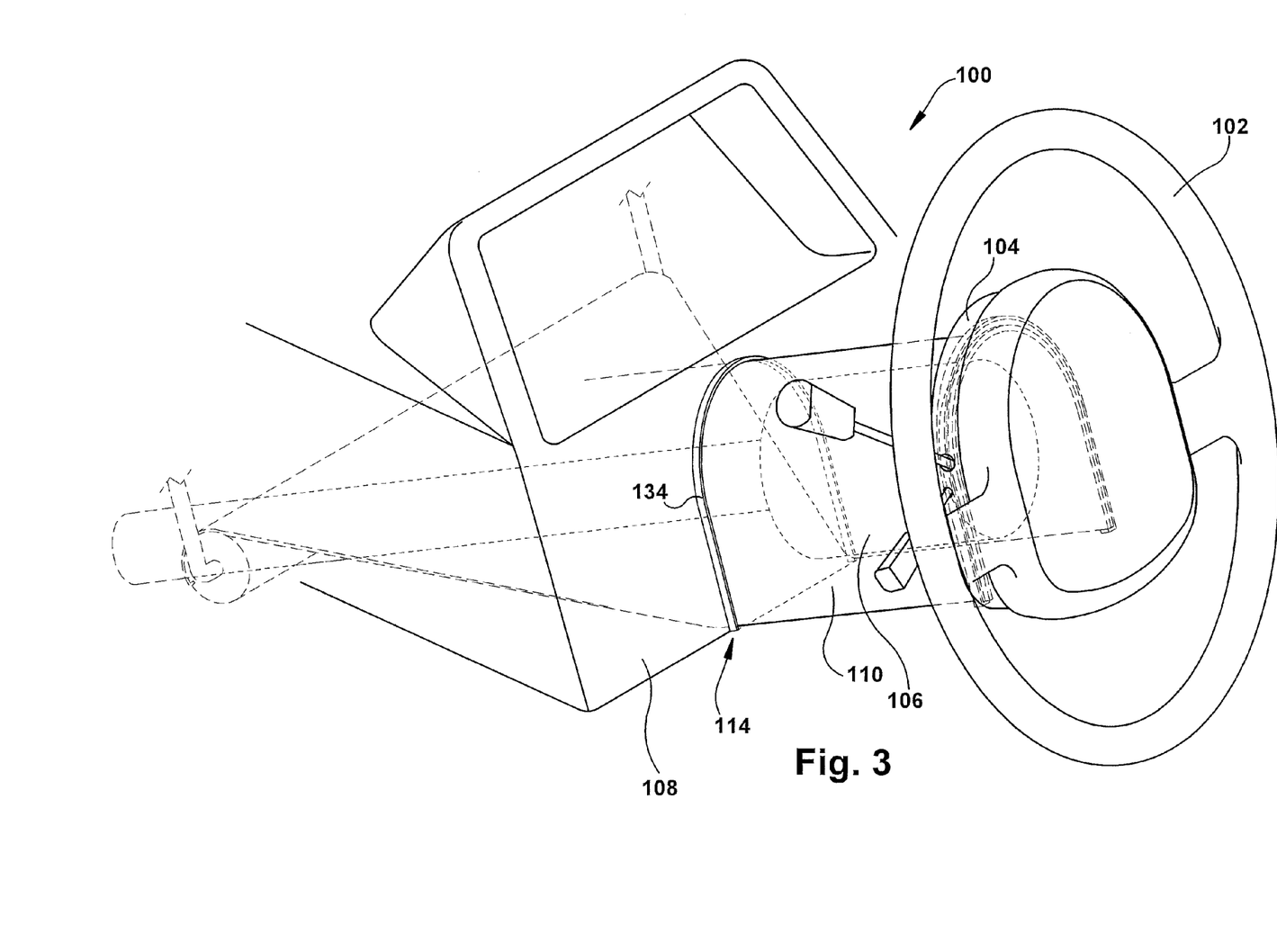
FIG. 3 is a perspective view of a driver's side of a passenger compartment of an automobile equipped with a steering column cover of the present invention.

With reference to FIG. 3, a perspective view of a driver's side of a passenger compartment within an automobile is shown. Particularly, a telescoping steering assembly 100 according to the present invention is shown. As used herein, a telescoping steering assembly 100 is a steering assembly that is linearly movable toward and away from the driver. It will be appreciated by those skilled in the art that the present invention is amenable to tilt steering assemblies as well.

The steering assembly 100 includes a steering wheel 102, a steering base 104, a telescoping steering column 106, a meter panel 108, and a steering column cover assembly 110. The steering wheel 102 is a ring that is disposed adjacent to a driver in the passenger compartment. The steering wheel 102 is a capable of rotation, and provides a mechanism for the driver to provide directional instructions to the vehicle. The steering wheel 102 is rotatably attached to the base 104, with the base 104 being fixedly attached to the steering column 106. This assembly allows the steering wheel 102 to rotate, while the fixed base 104 remains stationary. The steering base 104 preferably remains stationary so as to hold other driver controls, such as a turn signal 112, in a fixed position.

Figure 6:
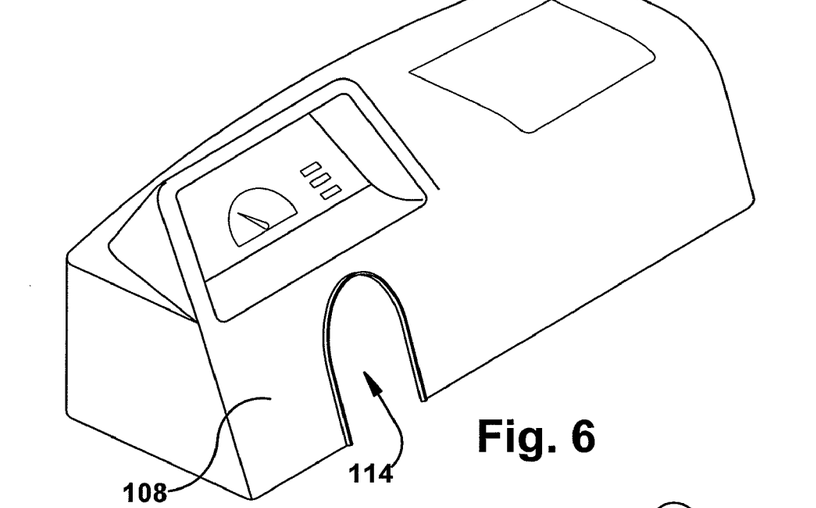
FIG. 6 is a perspective view of the meter panel of the present invention.

The column 106 is attached, at a distal end, to the base 104. The column 106 extends away from the base 104 toward the meter panel 108. At a proximal end, the column 106 passes through an opening 114 in the meter panel 108, and is attached to steering components (not shown) underneath or behind the meter panel 108. With reference to FIG. 6, a wall defining the perimeter of the meter panel opening 114 is generally shaped like an upside-down U. When the column 106 passes through the opening 114, the two combine to reduce the opening 114 into an upside-down U-shaped slit 134.

To facilitate the telescoping motion of the steering assembly 110, the column 106 is attached to telescoping components within the meter panel 108. As with the steering components, the telescoping components that allow the steering column 106 to telescope or tilt are not explicitly shown. The invention is applicable to all mechanisms allowing a telescoping or tilting motion, and is therefore movable according to any known mechanism for steering column motion.

The cover assembly 110 extends through the slit 134, and attaches to the steering base 104. Particularly, the cover assembly 110 over the column 106 is continuously taut and takes a shape so as to cover normally visible portions of the column 106.

Figure 4:
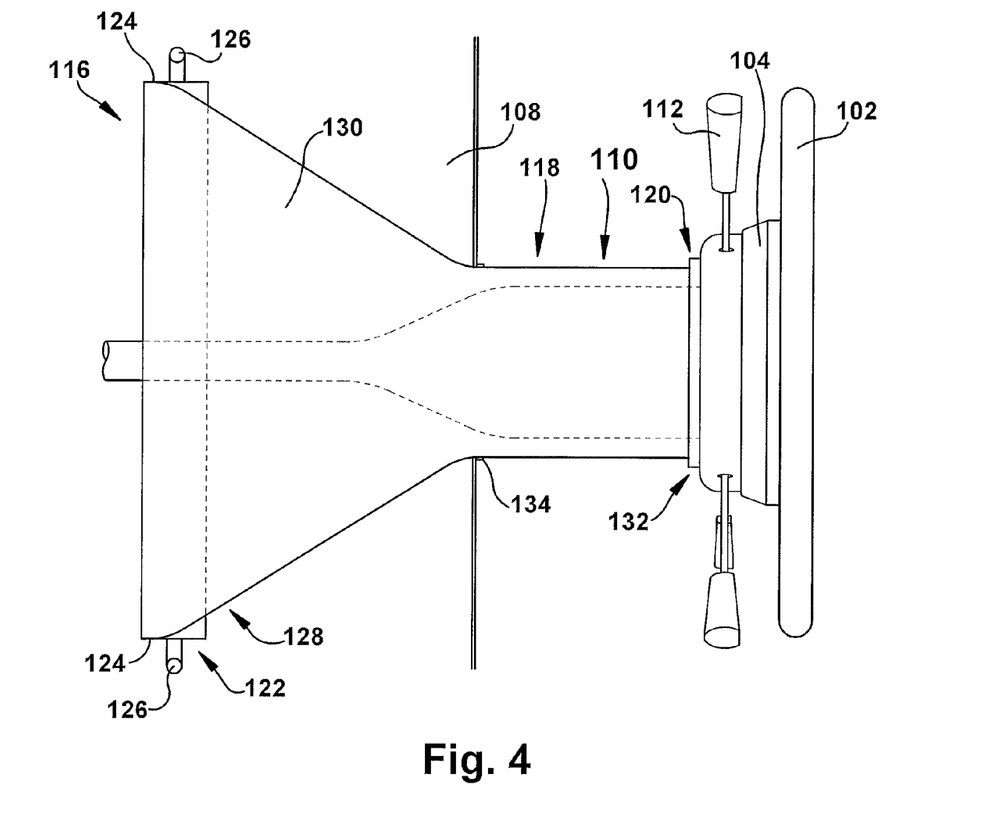
FIG. 4 is a top schematic view of the steering assembly with the column cover of the present invention.

With reference to FIGS. 3 and 4A, the cover assembly 110 is shown. The cover assembly 110 includes a roller portion 116, a blind portion 118, and a clip portion 120. The roller portion 116 and blind portion 118 are shown isolated from the remainder of the cover assembly 110 in FIG. 5A. The roller portion 116 is disposed within the meter panel 108, and includes a rod 122 held between a pair of tensioners 124. The tensioners 124 serve as circular ends to the rod 122, each of the circular ends having a diameter greater than that of rod 122. The rod 122 is rotatably held at opposing ends to each of the tensioners 124.

Figure 5A:
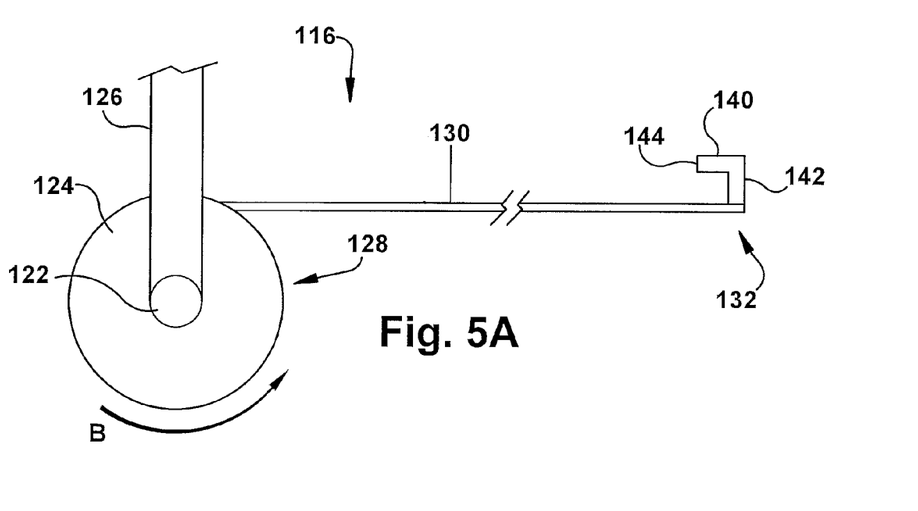
FIG. 5A schematically illustrates a roller and film of the column cover of the present invention.
Figure 5B:
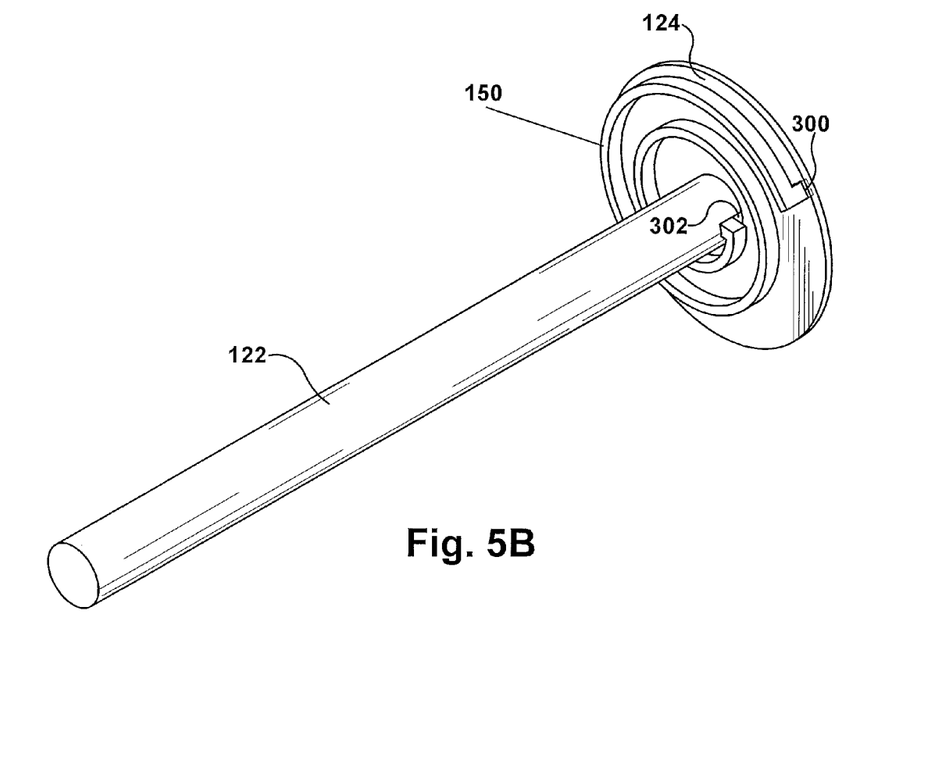
FIG. 5B is an exploded view of the roller.

Each of the pair of tensioners 124 is attached to a spring 150 that biases the rod 122 for rotation in a direction of the arrow B (the tensioners 124 and the spring 150 are a biasing assembly). The spring 150 is a coil spring that has one end attached to a first connector 300 on a tensioner 124 and the other end attached to a second connector 302 on the rod 122. It is submitted that numerous tensioning assemblies are known in the art and may be used with equal functionality, so the present invention is not limited to the illustrated coil spring. Rather, it is contemplated that other biasing mechanisms, such as a torsion spring, can effectively be used with the present invention.

The tensioners 124 are attached to a fixed structure (not shown) underneath the meter panel 108 by attachment bars 126. Thus, the tensioners 124 and the attachment bars 126 are fixed, while the rod 122 is rotatable within the tensioners 124, and is biased in a direction away from the driver by the springs 150.

A proximal end 128 of the blind portion 118 attaches to the rod 122. The blind portion 118 is formed from a flexible film 130, with a distal end 132 opposite the proximal end 128. The flexible film 130 may be formed of leather, fabric, flexible polymer, or other suitable material.

Preferably, the blind portion 118 is attached along the entire width of the proximal end 128 to the rod 122. The attachment is made such that as the rod 122 rotates in the direction of the arrow B, the film 130 is wound or wrapped around the rod 122. Accordingly, when film 130 is wound around the rod 122, the proximal end 128 of the film 130 is progressively covered by layers of film 130.

The film 130 extends from the rod 122 toward the upside-down U-shaped slit 134 formed between the wall of the meter panel defining the meter panel opening 114 and the column 106. As the film 130 passes through the slit 134, the film 130 necessarily takes an upside-down U-shape matching that of the slit 134. Accordingly, as the film 130 extends from the roller portion 116 to the slit 134, the film 130 tapers to an upside-down U-shape matching that of the slit 134.

From the slit 134, the film 130 extends along the length of the column 106 projecting from the meter panel opening 114. As the film 130 emerges from the meter panel opening 114, the film is in an upside-down U-shape and covers upper and side portions of the column 106.

The distal end 132 of the film 130 is attached to the clip portion 120. The clip portion 120 is likewise attached to a bottom of the steering base 104, which faces the meter panel 108. The clip portion 120 has a shape that is substantially identical to that of the upside-down U-shaped slit 134 through the meter panel opening 114, and substantially similar to the upper and side portions of the column 106. The shape of the clip portion 120 ensures that the portion of the film 130 extending from the meter panel slit 134 maintains an upside-down U-shape to cover the upper and side portions of the column 106.

A hook 140 is attached along the width of the film distal end 132. With reference to FIG. 5A, the hook 140 is generally L-shaped, and extends towards a top of the vehicle from the film 130 as the film 130 unwinds from the roller portion 116. The hook 140 has a leg 142 that rises perpendicularly from the film 130, and a leg 144 that extends parallel to the film 130 from a joint with the perpendicular leg 142, such that the parallel leg 144 extends toward the roller portion 116. As will be described below, the hook 140 is adapted to engage the clip portion 120.

Figure 7:
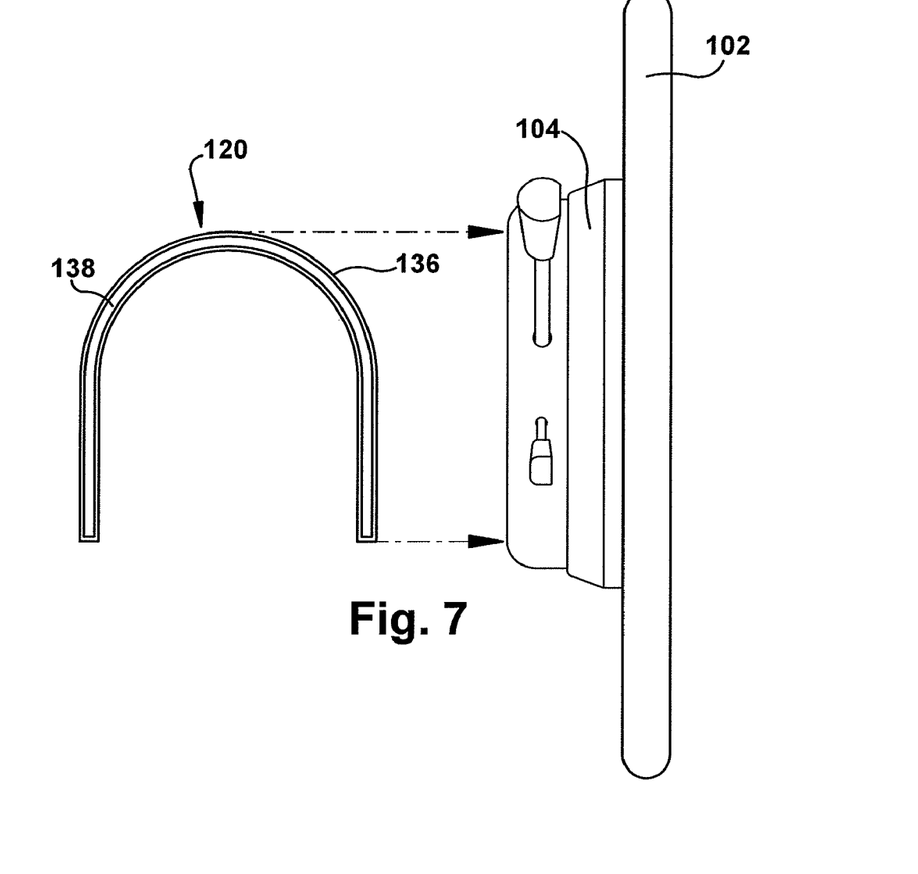
FIG. 7 is an exploded view of the steering wheel and a steering base clip of the present invention.
Figure 8A:
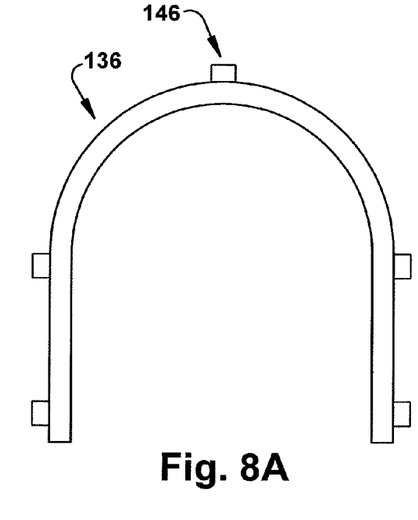
FIG. 8A is a back view of the steering base clip of the present invention.
Figure 8B:
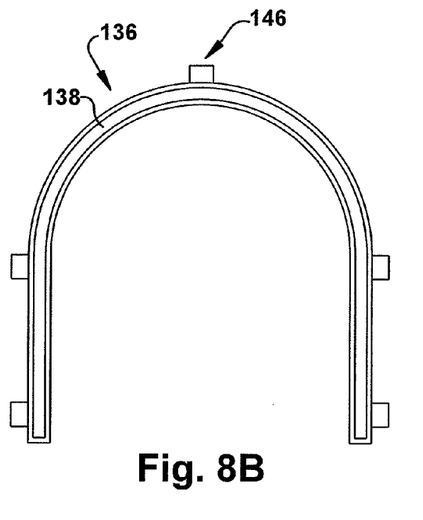
FIG. 8B is a front view of the steering base clip of the present invention.
Figure 8C:
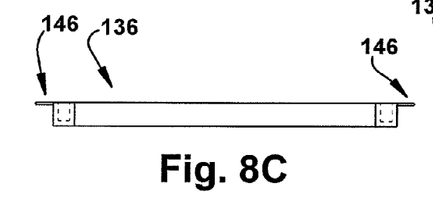
FIG. 8C is a bottom view of the steering base clip of the present invention.

The clip portion 120 includes an upside-down U-shaped clip 136 that attaches to the steering base 104. The clip 136 is shown in FIGS. 8A-8D. In FIG. 8A, a back side of the clip 136 is shown. FIG. 8B shows a front side of the clip 136, where a groove 138 within a central portion of the clip 136 can be seen. The groove 138 is upside-down U-shaped and extends along the front side of the clip 136. The clip 136 attaches to the steering base 104 so that the front side of the clip 136, having the groove 138 formed therein, is facing the steering wheel 102, while the back side of the clip 136 faces the meter panel 108, as shown in FIG. 7.

Figures 8D, 9:
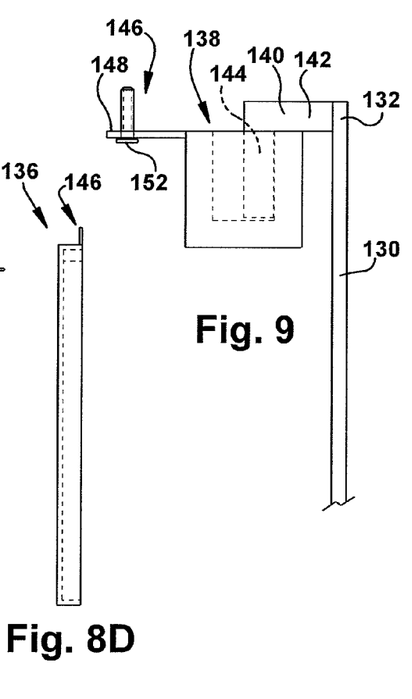
FIG. 8D is a side view of the steering base clip of the present invention.
FIG. 9 schematically illustrates the attachment of the film with the steering base clip according to the present invention.

In the exemplary embodiment shown in FIGS. 8A-8B and 9, the clip 136 is attached to the steering base 104 by connecting portions 146. As shown, the clip 136 has five connecting portions 146 disposed along a periphery of the clip 136, extending from the front side of the clip 136. Each of the connecting portions 146 includes a planar extension 148 having a hole defined therein. A screw 152 passes through the hole in the planar extension 148 and thereby connects the clip 136 to the steering base 104. The connecting portions 146 are one type of connecting means that can be used to attach the clip 136 to the steering base 104. It will be appreciated by one skilled in the art that the clip 136 can be attached to the steering base 104 using varying attaching means.

As shown in FIG. 9, the distal end 132 of the film 130 extends past the clip 136 such that the entirety of the hook 140 is past the clip 136. Then, the parallel leg 144 of the hook 140 is inserted into the groove 138 on the front side of the clip 136, and the film 130 retracts until the engagement of the hook 140 and the clip 136 is secure. The retraction of the film 130 pulls the film 130 back such that the perpendicular leg 142 rests against the sidewall adjacent the groove 138 of the clip 136. Thus, when the clip 136 is attached to the steering base 104 through the connecting portions 146, the hook 140 will be sandwiched between the steering base 104 and the clip 136, thereby ensuring a secure connection between the film 130 and the clip 136.

Preferably, the parallel leg 144 has a length that is equal to the depth of the groove 138 in the clip 136. Further, the perpendicular leg 142 preferably has a length that is equal to a length of the sidewall adjacent to the groove 138 in the clip 136.

As mentioned above, the clip 136 is upside-down U-shaped. Accordingly, the hook 140 on the distal end 132 of the film 130 is capable of taking an identical upside-down U-shape. To achieve this shape, the hook 140 can be formed of a soft, plastic material, so as to allow the hook 140 to bend with the distal end 132 of the film 130. Alternatively, the hook 140 can be formed of a hard plastic, so as to constantly hold the distal end 132 of the film 130 in the necessary upside-down U-shape.

Preferably, the clip 136 is first attached to the hook 140, and then the clip 136 is attached to the steering base 104. According to this method, the hook 140 is first inserted into the groove 138 of the clip 136, and then, the front side of the clip 136 is pressed against the steering base 104, and the screws 152 are driven through the planar extensions 148. As the screws are tightened, the clip 136 presses the hook 140 into the steering base 104, thereby further securing the film 130 and the clip 136 to the steering base 104.

Alternatively, the clip 136 can be attached to the steering base 104 with a gap formed along an inside curve of the upside-down U-shape. This arrangement would allow the hook 140 to engage the clip 136 after the clip 136 is already installed on the steering base 104. With such an arrangement, additional consideration need be given the interaction and fit of the hook 140 and the groove 138. Preferably, the size of the hook 140 and the groove 138 is similar to one another. Further, the elements can be provided with a detent or snap-fit mechanism to ensure secure connection.

Figure 10A:
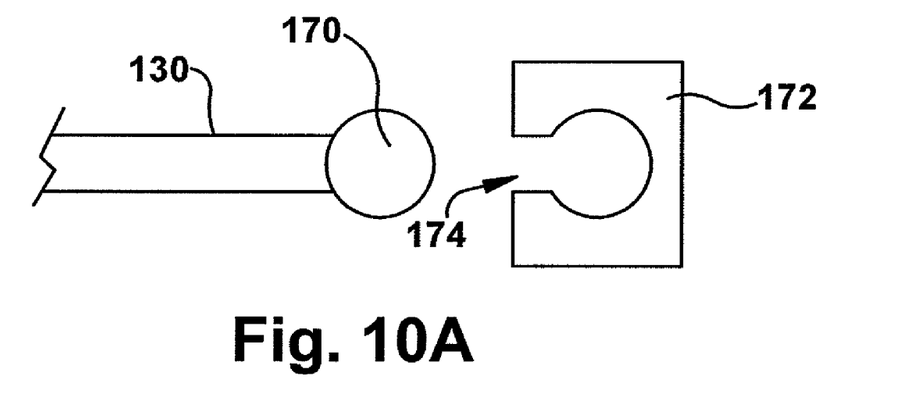
FIG. 10A is a bottom view of a clip and film attachment according to an alternative embodiment.
Figure 10B:
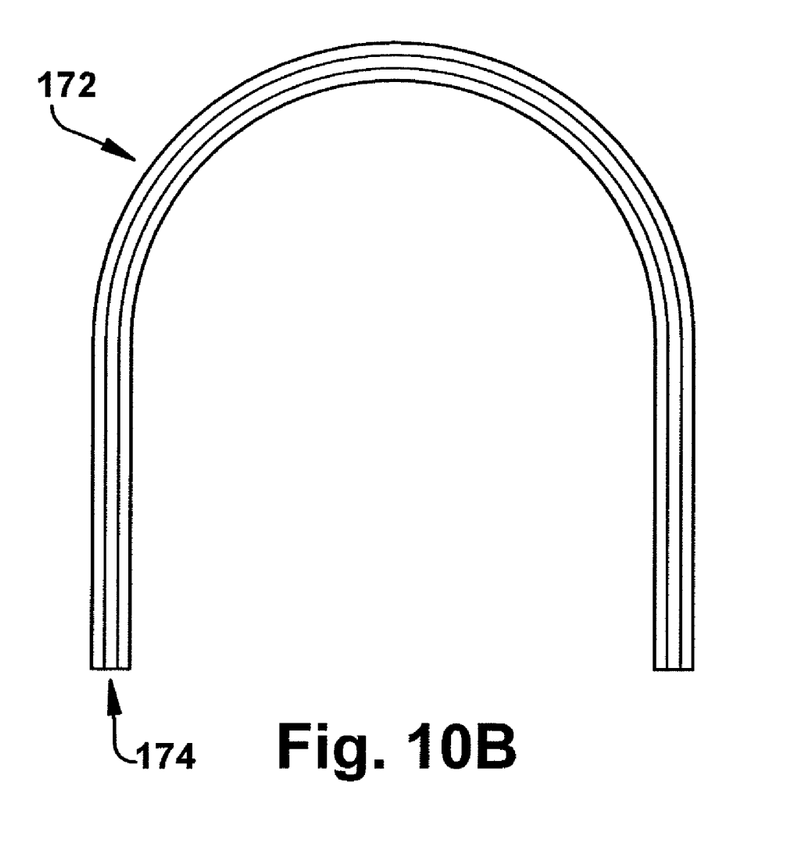
FIG. 10B is a rear view of the clip according to the alternative embodiment.

Moreover, in an embodiment where the clip is attached to the steering base 104 before the film 130 is attached thereto, alternative means for attaching the film 130 to the clip exist. One such alternative is shown in FIGS. 10A and 10B. The embodiment shown therein includes a bulb 170 (i.e., a bulbous portion) provided on the film distal end 132. A bulb receiving clip 172, in turn, is provided with a bulb shaped groove 174 to receive the bulb 170, and thereby secure the film 130 to the steering base 104. The film bulb 170 is inserted into a bottom end of the bulb receiving clip 172, and then slid through the bulb shaped groove 174 along the upside-down U-shaped bulb receiving clip 172. Thus, the film 130 is effectively attached to the steering base 104 through the clip 172.

The above alternatives are all provided as exemplary methods of attachment. However, the present invention is amenable to other attachment methods. For example, the film distal end 132 can be directly sewn or glued to the steering base 104, or the steering base 104 can integrally include a clip to receive the hook 140.

As constructed, the film 130 is attached at the proximal end 128 to the spring biased rod 122 of the roller portion 116. The film 130 extends through the upside-down U-shaped slit 134 between the meter panel opening 114 and the column 106. As the film 130 passes through the slit 134, the film 130 takes on an upside-down U-shape matching that of the slit 134. The film 130 extends along the column 106 and connects to the upside-down U-shaped clip 136 that is attached to the steering base 104. It is noted that the film 130 tapers into the upside-down U-shape as it approaches the slit 134.

Figure 11:
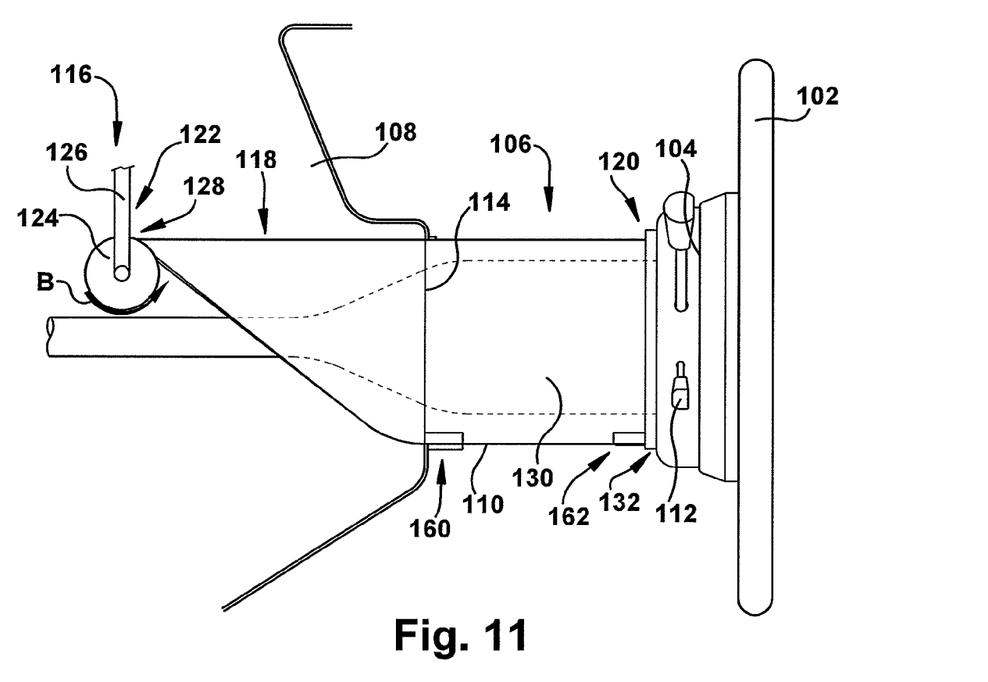
FIG. 11 is a schematic side view of a steering assembly with the of the present invention having guide portions.

To ensure that the film 130 follows a consistent upside-down U-shape, guides 160, 162 (i.e., guide portions) can be provided by the meter panel 108 and the steering base 104. Such guides are illustrated in FIG. 11. The meter panel guide 160 extends from the meter panel 108, at a portion adjacent to a bottom of the meter panel opening 114, toward the steering base 104. The steering base guide 162 extends from a bottom portion of the steering base 104 toward the meter panel 108. Both of the guides 160, 162 define grooves that run in a direction generally parallel with the steering column 106. The guides 160, 162 receive an edge of the film 130 so as to restrict the outward stretching of the film 130. By preventing the film 130 from stretching into a planar shape, the guides 160, 162 maintain the film 130 in a constant upside-down U-shape along the length of the film 130 that is extended from the meter panel opening 114. The length of each of the guides 160, 162 can be adjusted so as to properly secure the film 130, and will depend on factors such as the stiffness of the film 130.

In operation, the film 130 is capable of continuously covering the top and side portions of the column 106 regardless of the position or extension of the column 106. Both types of motion, telescoping and tilt, result in some differences in the amount the column 106 extends from the meter panel opening 114. Accordingly, the film 130 can adjust to any length within a predetermined range of motion between a maximum extension (tilt) and a minimum extension (tilt).

The length adjustment of the film 130 is achieved by the roller portion 116. Starting from a position wherein the column 106 is moved away from the driver and into the meter panel 108 as far as possible (i.e., minimum extension), the film 130 is maximally rolled around the rod 122. As the column 106 is moved toward the driver, more of the column 106 extends from the meter panel opening 114. Accordingly, the fixed distal end 132 of the film 130 pulls on the film 130 wound around the rod 122. This causes the rod 122 to rotate in a direction opposite of the arrow B, unwinding the film 130 from the roller portion 116. Thus, the film 130 continuously covers the top and sides of the steering column 106 regardless of the amount the steering column 106 extends (or tilts) from the meter panel 108.

Further, the rod 122 is constantly biased to rotate the film in a winding direction (away from the driver), in the direction of the arrow B. This biases the film 130 away from the steering wheel 102 and maintains the film 130 in tension on the rod 122.

Maintaining tension on the film removes slack from the film 130, and thereby prevents wrinkles. Additionally, by using a roller portion 116 to tension the film 130, the film 130, at the point of passing through the meter panel opening 114 is maintained in a shape corresponding to the column 106.

The present invention has been described according to a preferred embodiment. The preferred embodiment is merely illustrative of the invention, and is not meant to limit the scope of the invention. It is considered apparent that one skilled in the art would recognize that the present invention is amenable to various modifications and alterations. All such modifications and alterations are considered to be within the scope of the invention.

What is claimed is:

1. A telescoping steering assembly, including a cover for covering a telescoping steering column, the cover having a roller portion attached beneath a meter panel and secured to a proximal end of a blind film, a distal end of the blind film being attached to a steering base, wherein the roller portion includes a rod around which the blind film is wound and unwound, and a biasing assembly rotatably biasing the rod to maintain the blind film in tension regardless of an amount of extension and retraction of the steering column, the biasing assembly including two tensioners each attached to a different end of the rod, and at least one spring connecting at least one of the tensioners to the rod, the at least one spring biasing the rod for rotation in a direction away from the steering base, wherein a clip secures the distal end of the blind film to the steering base, the clip having an opening defined at a back face thereof, said opening having a narrow portion adjacent to the back face of the clip, and a wider portion spaced from the back face, wherein the blind film is sized to fit within the narrow portion of the opening and provides a bulbous portion along the distal end of the blind film, the bulbous portion being sized to fit within the wider portion of the opening but not through the narrow portion of the opening, and wherein the distal end of the blind film is received within the opening with the bulbous portion in the wider portion of the opening, and the receipt of the bulbous portion in the wider portion of the opening attaches the distal end of the film to the steering base.

2. The telescoping steering assembly according to claim 1, wherein the meter panel defines an upside-down U-shaped opening and the telescoping steering column passes through the upside-down U-shaped opening so as to define an upside-down U-shaped slit.

3. The telescoping steering assembly according to claim 2, wherein the clip is upside-down U-shaped and defines the opening along a length of the upside-down U-shape at the back face of the clip, and wherein the distal end of the blind film is attached to the clip by sliding the bulbous portion of the blind film through the wider portion of the opening until an entire width of the distal end of the blind film is secured by the clip.

4. The telescoping steering assembly according to claim 3, wherein at least one of the meter panel and the steering base provide guide portions for maintaining the blind film in an upside-down U-shape.

\* \* \* \* \*